US012598445B2

(12) United States Patent
Park

(10) Patent No.: US 12,598,445 B2
(45) Date of Patent: Apr. 7, 2026

(54) APPARATUS FOR CONTROLLING MEDIA SERVER USING MOBILE APPLICATION

(71) Applicant: AKP Inc., Sejong-si (KR)

(72) Inventor: Dae Hyeon Park, Seoul (KR)

(73) Assignee: AKP Inc., Sejong-si (KR)

( * ) Notice: Subject to any disclaimer, the term of this patent is extended or adjusted under 35 U.S.C. 154(b) by 290 days.

(21) Appl. No.: 18/542,787

(22) Filed: Dec. 18, 2023

(65) Prior Publication Data

US 2025/0193634 A1　Jun. 12, 2025

(30) Foreign Application Priority Data

Dec. 8, 2023　(KR) ........................ 10-2023-0177805

(51) Int. Cl.
H04W 4/021 (2018.01)
G06T 19/00 (2011.01)
G06V 10/764 (2022.01)
H04L 67/306 (2022.01)

(52) U.S. Cl.
CPC ........... H04W 4/021 (2013.01); G06T 19/006 (2013.01); G06V 10/764 (2022.01); H04L 67/306 (2013.01)

(58) Field of Classification Search
CPC ................................ H04W 4/021; H04W 4/02
USPC ...................................................... 455/456.1
See application file for complete search history.

(56) References Cited

U.S. PATENT DOCUMENTS

| | | | | |
|---|---|---|---|---|
| 10,846,935 | B2 * | 11/2020 | Sergott | H04W 4/025 |
| 12,073,614 | B2 * | 8/2024 | Rogan | G06Q 30/0209 |
| 2019/0221045 | A1 * | 7/2019 | Li | G06T 19/006 |
| 2022/0103969 | A1 * | 3/2022 | Drummond | H04L 67/125 |
| 2022/0124063 | A1 * | 4/2022 | Choi | G06T 19/006 |

FOREIGN PATENT DOCUMENTS

| | | | |
|---|---|---|---|
| KR | 10-2010-0129627 | A | 12/2010 |
| KR | 10-2019-0107252 | A | 9/2019 |
| KR | 10-2020-0112251 | A | 10/2020 |
| KR | 10-2167010 | B1 | 10/2020 |
| KR | 10-2021-0123107 | A | 10/2021 |
| KR | 10-2022-0106373 | A | 7/2022 |

* cited by examiner

*Primary Examiner* — Qutbuddin Ghulamali
(74) *Attorney, Agent, or Firm* — Revolution IP, PLLC

(57) ABSTRACT

Provided is a device for controlling a media server that allows a user touring a tourist spot (TS) to control the media server through a mobile application (MA) of a user terminal, the device including an augmented reality (AR) implementation part configured to implement a TS as AR divided into a plurality of subareas (SAs) and transmit an avatar (AT) choice message (ACM) for selecting an AT to be generated in the AR to the user terminal, an AT generator configured to generate a selected AT in the AR implemented by the MA, an AT controller configured to cause, when it is determined that the user enters a specific SA of the TS, the generated AT to explain tour information of the specific SA, and a media server operator configured to execute a program for welcoming a user to enter the specific SA through modules provided in the specific SA.

6 Claims, 4 Drawing Sheets

【FIG. 1】
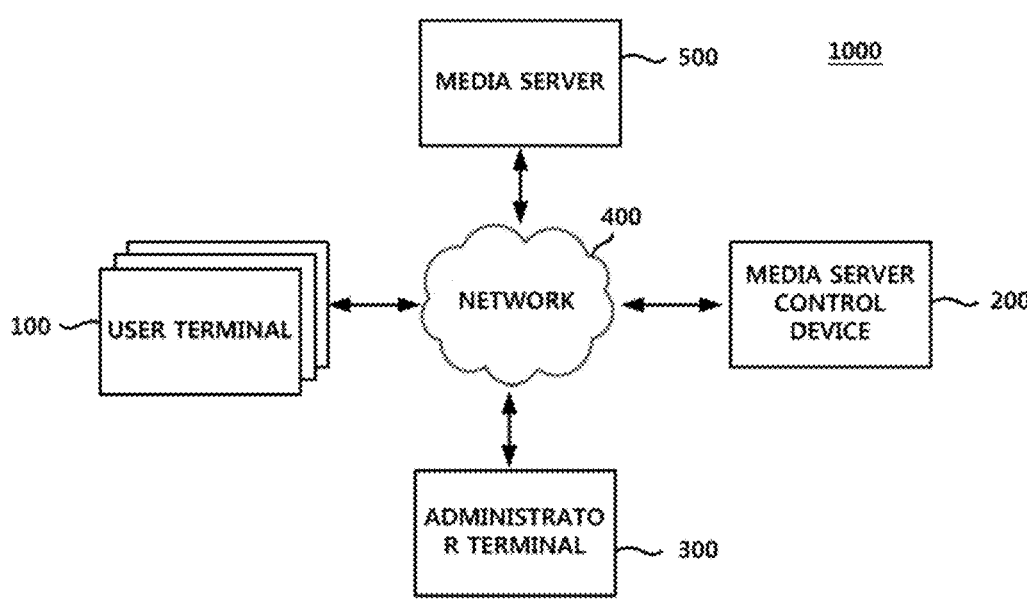

【FIG. 2】
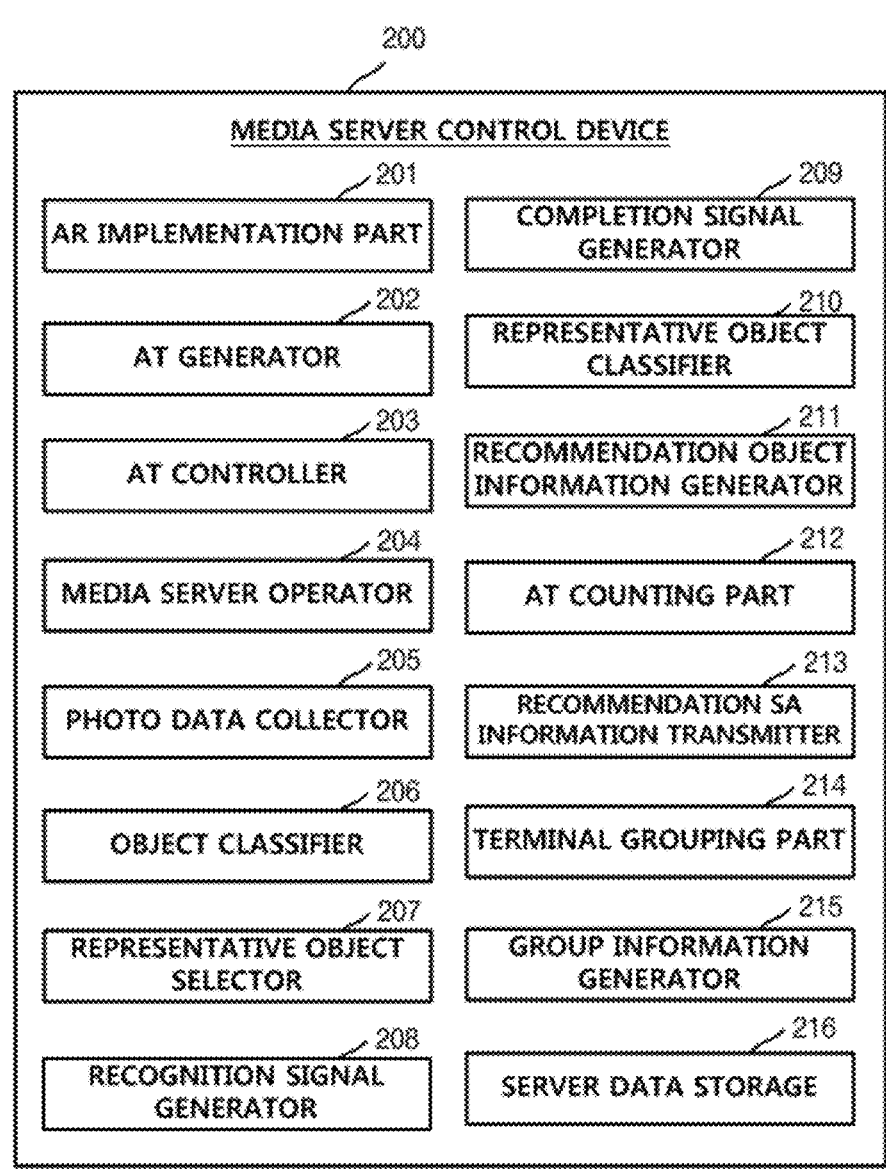

【FIG. 3】
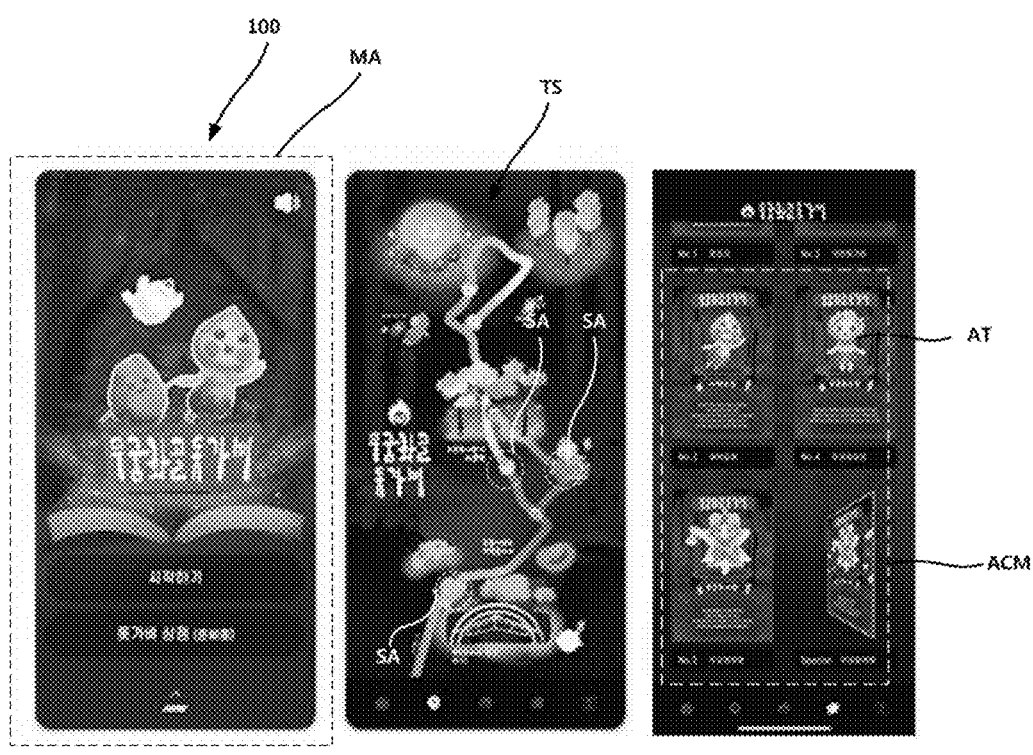

【FIG. 4】

APPARATUS FOR CONTROLLING MEDIA SERVER USING MOBILE APPLICATION

FIELD OF THE INVENTION

The present invention relates to a device for controlling a media server using a mobile application (MA), and more particularly, to a device for controlling a media server using an MA that allows a user to control the media server for implementing augmented reality (AR) through an MA.

DISCUSSION OF RELATED ART

Recently, virtual reality (VR) and augmented reality (AR) have been attracting attention. VR is a technology for creating a virtual space with virtual images of a background and objects, while AR is a technology for superimposing a three-dimensional (3D) virtual image on a real-world image and showing them as a single image. VR applications provide users with experiential environments by interacting with the users in a virtual space according to the users' actions transmitted through separate devices such as VR glasses, a motion recognition device, and the like. AR applications enable interaction between objects in the real word and virtual objects and thus are characterized by a high sense of realism. Compared to a simple VR technology, AR blurs the distinction between a real environment and a virtual environment by providing a 3D virtual environment together with real images and thus can provide a better sense of realism. Accordingly, there is an increasing demand for users to receive information that they cannot experience in real life using AR or to use various services that incorporate AR in various fields such as education, design, games, and the like.

The present specification will describe a device that allows a user to control a media server for implementing AR using a mobile application (MA).

RELATED ART DOCUMENT

Korean Patent No. 10-2167010

SUMMARY OF THE INVENTION

Problem to be Solved

The present invention is directed to providing a device for controlling a media server using a mobile application (MA), and more particularly, to a device for controlling a media server using an MA that allows a user to control the media server for implementing augmented reality (AR) through an MA.

Technical Solution

According to an aspect of the present invention, there is provided a device for controlling a media server that allows a user touring a tourist spot (TS) to control the media server through an MA of a user terminal so that a lighting module, a sound module, and a display module provided in the TS operate, the device including an AR implementation part configured to implement, when a user accesses an MA through a user terminal, a TS as AR divided into a plurality of subareas (SAs) and transmit an avatar (AT) choice message (ACM) for selecting an AT that may be generated in the AR to the user terminal, an AT generator configured to generate, when the user selects an AT on the basis of the ACM, the selected AT in the AR implemented by the MA, an AT controller configured to cause, when it is determined on the basis of location information received from a Global Positioning System (GPS) module of the user terminal that the user enters a specific SA of the TS, the generated AT to explain tour information of the specific SA, and a media server operator configured to execute, when the user enters the specific SA of the TS, a program for welcoming a user to enter the specific SA through modules provided in the specific SA. The user accesses the MA by inputting user information including his or her age, sex, and relationship with an accompanying user through the user terminal.

The device may further include a photo data collector configured to collect photo data captured through user terminals in the SA while users are present in the SA, an object classifier configured to recognize objects in the photo data other than a recognized person by analyzing the collected photo data, classify corresponding photo data by recognized object, and classify objects in decreasing order of the number of pieces of classified photo data, and a representative object selector configured to select objects of a set rank or above as representative objects of the SA from among the classified objects. When the user enters the specific SA of the TS, the AT controller may cause the generated AT to introduce the representative objects of the specific SA and recommend taking photos including the objects.

The device may further include a recognition signal generator configured to analyze the photo data captured through the user terminal in the SA while the user is present in the SA and generate and transmit an object recognition signal to the user terminal when a representative object is recognized in the photo data and a completion signal generator configured to generate and transmit a completion signal to the user terminal when recognition signals corresponding to all the representative objects in the SA are generated while the user is present in the SA. When the recognition signal is generated, the AT controller may explain that photo data of the object corresponding to the recognition signal has been successfully captured, and when the completion signal is generated, the media server operator may cause the modules provided in the specific SA to execute a program for congratulating the user on complete exploration of the SA.

The device may further include a representative object classifier configured to count the number of representative objects photographed by each of the users who are present in the SA by analyzing the photo data captured through the user terminals of the users and classify the representative objects in real time in decreasing order of counting number and a recommendation object information generator configured to recommend, when the user has not photographed some representative objects in the SA, exploration of a representative object with the largest counting number among the corresponding representative objects and generate, when a plurality of representative objects have the largest counting number, recommendation object information for recommending a representative object closest to a location of the user on the basis of location information received from the GPS module of the user terminal of the user and transmit the recommendation object information to the user terminal. When the recommendation object information is generated, the AT controller may cause the generated AT to guide the user to the representative object included in the recommendation object information.

The device may further include an AT counting part configured to count the number of ATs generated in each SA in real time and a recommendation SA information transmitter configured to, when the completion signal is generated, extract first SAs that the user has not entered from SAs other than an SA corresponding to the completion signal, extract second SAs in which the counting number of ATs is a set value or less from the first SAs, generate recommendation SA information for recommending exploration of the second SAs in increasing order of distance to the SA corresponding to the completion signal, and transmit the recommendation SA information to the user terminal.

The device may further include a terminal grouping part configured to receive location information of user terminals in real time and group a plurality of user terminals when the user terminals are continuously present within a set distance range for a set period of time and a group information generator configured to analyze user information corresponding to the grouped user terminals and the number of user terminals, determine a relationship between users of the grouped user terminals, and generate group information including the determined relationship. The group information may include any one of a friend relationship, a spouse relationship, a romantic relationship, a family relationship, and a parent-child relationship of the users of the grouped user terminals.

The device may further include a server data storage configured to store the programs executed by the media server operator, directing data of the AT according to the group information, and action algorithm data of the AT executed according to a specific signal from an administrator terminal. When the group information is generated, the AT controller may cause ATs corresponding to the user terminals of the group information to play a role according to the directing data which is stored in the server data storage according to information included in the group information. When the group information is generated, the media server operator may cause the modules provided in the SA, which is identified from the location information of the user terminal corresponding to the group information, to execute a program corresponding to the group information. When the specific signal is generated, the AT controller may control the generated AT according to the action algorithm data stored in the server data storage.

Advantageous Effect

A device for controlling a media server according to an exemplary embodiment of the present invention can implement AR of a TS for users through user terminals and generate ATs that help with exploring the TS in the AR. Further, the device selects objects in SAs, asks users to photograph all the objects, collects location information of the users in real time, and provides recommendation information of a next SA on the basis of the location information, thereby helping the users to explore the TS efficiently. In addition, the device directs an AT and provides media module effects appropriately according to a user's SA exploration, thereby helping the user to continue a tour with interest.

A device for controlling a media server according to an exemplary embodiment of the present invention determines group information of users moving in a group, directs ATs, and provides media module effects according to the determined group information, further enhancing the users' interest in a tour.

BRIEF DESCRIPTION OF THE DRAWINGS

FIG. 1 is a schematic diagram of a system for controlling a media server using a mobile application (MA) according to an exemplary embodiment of the present invention;

FIG. 2 is a block diagram of a media server control device according to an exemplary embodiment of the present invention:

FIG. 3 is a set of examples of execution screens of an MA according to an exemplary embodiment of the present invention; and FIG. 4 is a set of examples illustrating a media server according to an exemplary embodiment of the present invention.

DETAILED DESCRIPTION OF EXEMPLARY EMBODIMENTS

Exemplary embodiments of the present invention will be described in detail below with reference to the accompanying drawings so that those of ordinary skill in the art to which the present invention pertains can easily implement the present invention. However, the present invention may be implemented in many different forms and is not limited to the embodiments described herein. To clearly illustrate the present invention in the drawings, parts not pertinent to the description are omitted, and like reference numerals will be used for like elements throughout the specification.

As used herein, when a first part is referred to as "connected" to a second part, the first part may be "directly connected" to the second part or "electrically connected" to the second part with a third part interposed therebetween. Also, when a component is referred to as "including" another component, other components are not excluded and the component may include other components unless particularly described otherwise. Hereinafter, the present invention will be described in detail with reference to the accompanying drawings.

Referring to FIG. 1, a system 1000 for controlling a media server 500 may include user terminals 100, an administrator terminal 300, a media server 500, and a media server control device 200 connected thereto through a network 400.

The user terminals 100 may be terminals used by users who explore a tourist spot (TS). A user may explore a TS while experiencing the TS implemented as augmented reality (AR) using his or her user terminal 100.

The administrator terminal 300 may be a terminal used by a person who manages the TS. The administrator may install the media server 500 in the TS and determine how to operate the media server 500.

The user terminals 100 and the administrator terminal 300 may be smartphones. However, the user terminals 100 and the administrator terminal 300 are not limited thereto and may be electronic devices such as a general desktop computer, a laptop computer, a digital broadcasting terminal, a personal digital assistant (PDA), a portable multimedia player (PMP), a tablet personal computer (PC), and the like. The electronic devices may have one or more general or special purpose processors, a memory, a storage, and/or a (wired or wireless) networking component.

The media server 500 may include devices that are installed in the TS to provide various effects to tourists. As an example of the present invention, the media server 500 may include a lighting module, a sound module, and a display module for outputting images, and modules that provide various other effects may be included. These may be connected through the network 400 and operated by the media server control device 200 to be described below.

The media server control device 200 may receive data from the user terminals 100 and the administrator terminal 300 and transmit data obtained by processing the received data to the user terminals 100 and the media server 500. The media server control device 200 may be a server. Functions of the media server control device 200 may be implemented through a mobile application (MA) installed on the user terminals 100.

The media server control device 200 will be described in further detail with reference to FIGS. 2 to 4.

The communication method of the network 400 is not limited and may not only be a communication method employing a communication network (e.g., a mobile communication network, a wired network, a wireless network, or a broadcast network) which may be included in the network 400 but may also be short-range wireless communication between devices. For example, the network 400 may include at least one of a personal area network (PAN), a local area network (LAN), a campus area network (CAN), a metropolitan area network (MAN), a wide area network (WAN), a broadband network (BBN), and the like.

FIG. 2 is a block diagram of a media server control device according to an exemplary embodiment of the present invention, FIG. 3 is a set of examples of execution screens of an MA according to an exemplary embodiment of the present invention, and FIG. 4 is a set of examples illustrating the media server 500 according to an exemplary embodiment of the present invention.

Referring to FIGS. 2 to 4, the media server control device 200 according to an exemplary embodiment of the present invention may include an AR implementation part 201, an avatar (AT) generator 202, an AT controller 203, a media server operator 204, a photo data collector 205, an object classifier 206, a representative object selector 207, a recognition signal generator 208, a completion signal generator 209, a representative object classifier 210, a recommendation object information generator 211, an AT counting part 212, a recommendation subarea (SA) information transmitter 213, a terminal grouping part 214, a group information generator 215, and a server data storage 216.

When a user accesses the MA through a user terminal 100, the AR implementation part 201 implements a TS as AR divided into a plurality of SAs and transmits an AT choice message (ACM) for selecting an AT that may be generated in the AR to the user terminal 100. As shown in FIG. 3, when the user accesses the MA through the user terminal 100, the user may select an AT on the basis of the ACM and check a path of the TS implemented as the AR through a map.

The user may access the MA by inputting user information. As the user information, the user's age, sex, and relationship with an accompanying user may be input.

When the user selects an AT on the basis of the ACM, the AT generator 202 may generate the selected AT in the AR implemented by the MA. The AT may play a role in providing various types of information in the AR to enhance the user's TS exploration.

The server data storage 216 stores a program executed by the media server operator 204, directing data of the AT according to group information to be described below, and action algorithm data of the AT executed according to a specific signal from the administrator terminal 300.

The program which is executed by the media server operator 204 to be described below may result from a program stored in the server data storage 216. Various actions of the AT controlled by the AT controller 203 may result from the action algorithm data of the AT stored in the server data storage 216. When the specific signal is generated, the AT controller 203 may control the generated AT so that the AT may act according to the action algorithm data of the AT stored in the server data storage 216.

When the AT controller 203 determines that the user enters a specific SA of the TS on the basis of location information received from a Global Positioning System (GPS) module (not shown) of the user terminal 100, the generated AT may explain tour information of the specific SA. When the user enters the specific SA, the AT controller 203 may control the generated AT so that the AT introduces things to see and features of the specific SA in the AR on the basis of previously stored related data of the specific SA. For example, when the user enters the specific SA, the AT controller 203 may recognize this from the specific signal and cause the AT to introduce the specific SA to the user according to an action algorithm which is based on the specific signal and stored in the server data storage 216.

When the user enters the specific SA of the TS, the media server operator 204 may execute a program for welcoming a user to enter the specific SA through modules provided in the specific SA. When the user enters the specific SA, the media server operator 204 may operate a lighting module, a sound module, a display module, and the like according to the program for welcoming a user to enter the SA as shown in FIG. 4, thereby providing splendid effects to the SA. The welcoming program may be a program stored in the server data storage 216 described above, and the media server operator 204 may execute the program through modules of the media server 500.

The photo data collector 205 may collect photo data captured through the user terminals 100 in an SA while the users are present in the SA. The users may run a photography mode through the MA installed on the user terminals 100 and take images while exploring the SA. The photo data collector 205 may collect photo data generated through such photography from the user terminals 100.

The object classifier 206 may recognize objects in the photo data other than a recognized person by analyzing the collected photo data, classify corresponding photo data by recognized object, and classify objects in decreasing order of the number of pieces of classified photo data.

The representative object selector 207 selects objects of a set rank or above as representative objects of the SA on the basis of the classified objects.

For example, the object classifier 206 may recognize a person in the collected photo data through an artificial intelligence model and recognize characteristic things (e.g., a statue) and the like in the photo data other than the recognized person as objects. After classifying photo data by recognized object, the object classifier 206 may classify the objects in decreasing order of the number of pieces of classified photo data, and the representative object selector 207 may select objects of the set rank or above as representative objects of the SA from among the classified objects.

The AT controller 203 may cause the generated AT to introduce the representative objects of the specific SA and recommend taking photos including the objects. When the representative objects are selected, a specific signal may be generated, and the AT controller 203 may recommend taking photos including the objects according to action algorithm data which corresponds to the specific signal and is stored in the server data storage 216. The user can immediately recognize the representative objects of the current SA through the AT and take photos in which the objects are shown.

The recognition signal generator 208 may analyze the photo data captured through the user terminal 100 in the SA while the user is present in the SA, and generate and transmit an object recognition signal to the user terminal 100 when a representative object is recognized in the photo data.

When recognition signals corresponding to all the representative objects in the SA are generated while the user is present in the SA, the completion signal generator 209 may generate and transmit a completion signal to the user terminal 100.

When a recognition signal is generated, the AT controller 203 may control the AT so that the AT notifies the user that photo data of an object corresponding to the recognition signal has been successfully captured. This action of the AT may result from action algorithm data which corresponds to the recognition signal and is stored in the server data. When the completion signal is generated, the media server operator 204 may cause modules provided in the specific SA to execute a program for congratulating the user on complete exploration of the specific SA. The program may be a program stored in the server data storage 216 described above.

The user may enter an SA, identify representative objects of the SA through an AT, and take photos in which the representative objects are shown according to a recommendation of the AT. When the photography of a specific representative object is completed, a recognition signal may be generated and transmitted to the user terminal 100, and the user may be notified by the generated AT that the representative object has been photographed well. When the photography of all the representative objects in the SA is completed, a completion signal may be generated and transmitted to the user terminal 100. Through an operation (e.g., an operation of outputting a text message representing the completion through a display module) of the media server 500 in the SA, the user may check that the photography of all the representative objects in the SA in which the user is present has been completed, and finish exploration of the SA.

The representative object classifier 210 may count the number of representative objects photographed by each of the users who are present in the SA through his or her user terminal 100 by analyzing photo data captured through the user terminal 100 of the user and classify the representative objects in real time in decreasing order of counting number.

When the user has not photographed some representative objects in the SA, the recommendation object information generator 211 may recommend exploration of a representative object with the largest counting number among the corresponding representative objects. When a plurality of representative objects have the largest counting number, the recommendation object information generator 211 may generate recommendation object information for recommending a representative object closest to the location of the user on the basis of location information received from the GPS module of the user terminal 100 of the user and transmit the recommendation object information to the user terminal 100. When the recommendation object information is generated, the AT controller 203 may cause the generated AT to guide the user to the representative object included in the recommendation object information.

In an SA, a plurality of users may proceed to explore, and the representative object classifier 210 may analyze photo data collected from user terminals 100 of the plurality of users in real time, count the number of representative objects recognized in the photo data, and classify the representative objects in real time in decreasing order of counting number. A representative object having a relatively large counting number may represent that there are many users who have finished photography of the representative object in the current SA. In this regard, when the user has not photographed some representative objects in the current SA, the recommendation object information generator 211 may generate recommendation object information for recommending a representative object with the largest counting number among the corresponding representative objects and transmit the recommendation object information to the user terminal 100. Since most of the users in the SA have completed the photography of the representative object already, the user may receive a recommendation to photograph the representative object from the AT and photograph the representative object, which leads to efficient exploration of the SA.

Further, when a plurality of representative objects have the largest counting number, the recommendation object information generator 211 may generate recommendation object information for recommending a representative object which is closest to the location of the user recognized through the GPS module of the user terminal 100 and transmit the recommendation object information to the user terminal 100. The user may minimize a time for exploring the SA by photographing the representative object according to the guidance of the AT.

The AT counting part 212 may count the number of ATs generated in each SA in real time.

When the completion signal is generated, the recommendation SA information transmitter 213 may extract first SAs that the user has not entered from SAs other than an SA corresponding to the completion signal, extract second SAs in which the counting number of ATs is a set value or less from the first SAs, generate recommendation SA information for recommending exploration of the second SAs in increasing order of distance to the SA corresponding to the completion signal, and transmit the recommendation SA information to the user terminal 100.

The AT counting part 212 may count the number of ATs generated in each SA in real time, and the number of ATs counted per SA may represent the number of users who are currently exploring each SA.

In other words, the recommendation SA information transmitter 213 selects SAs that are relatively less crowded with users at the time as SAs for the user to explore next so that the user can smoothly explore a next SA.

In some cases, the AT controller 203 may cause the AT which is generated for the user terminal 100 to provide the corresponding recommendation SA information.

The terminal grouping part 214 may receive the location information of the user terminals 100 in real time and group a plurality of user terminals 100 when the plurality of user terminals 100 are continuously present within a set distance range for a set period of time. For example, when users who are friends explore the TS together, the locations of user terminals 100 of the users may be maintained at a very close distance for a certain time. The terminal grouping part 214 may detect this and group the user terminals 100.

The group information generator 215 may analyze user information corresponding to the grouped user terminals 100 and the number of user terminals 100, determine a relationship between the users of the grouped user terminals 100, and generate group information including the determined relationship.

As described above, the user information may include the user's age, sex, and relationship with an accompanying user. The group information generator 215 may generate the group information on the basis of the user information and the number of user terminals 100 in the group. For example, when the number of user terminals 100 in a specific group is two and user information indicates one male and one female with an age gap of two years, the group information generator 215 may determine that the users of the group are in a romantic relationship and generate the determination as group information.

When the group information is generated, the AT controller 203 may cause ATs corresponding to the user terminals 100 of the group information to play a role according to the directing data which is stored in the server data storage 216 according to the group information.

When the group information is generated, the media server operator 204 may execute a program corresponding to the group information through modules provided in the SA.

For example, when users of a group corresponding to the group information are in a romantic relationship, the AT controller 203 may control ATs of the users so that the ATs act according to directing data of the theme of lovers, and the media server operator 204 may cause a lighting module, a sound module, a display module, and the like provided in the SA to output lighting, sound, and images that may be preferred by users in a romantic relationship according to a program corresponding to the group information.

In this way, the media server control device 200 according to an exemplary embodiment of the present invention may implement a TS for users as AR through user terminals 100 and generate ATs that help with exploring the TS in the AR. Further, the media server control device 200 selects objects in SAs, asks users to photograph all the objects, collects location information of the users in real time, and provides recommendation information of a next SA on the basis of the location information, thereby helping the users to explore the TS efficiently. Also, the media server control device 200 directs an AT and provides media module effects appropriately according to a user's SA exploration, thereby helping the user to continue a tour with interest. In addition, the media server control device 200 determines group information of users moving in a group, directs ATs, and provides media module effects according to the determined group information, further enhancing the users' interest in a tour.

The exemplary embodiments described above are merely illustrative, and those of ordinary skill in the art to which the foregoing embodiments pertain will understand that the embodiments can be readily adapted to other specific forms without changing the technical spirit or essential features thereof. Therefore, the exemplary embodiments described above should be construed as illustrative rather than limiting in all aspects. For example, each component described as singular may be implemented in a distributed manner, and likewise, components described as distributed may be implemented in a combined form.

A scope to be protected by this specification is indicated by the following claims rather than the detailed description and should be construed as including the meaning and scope of the claims and all modifications or variations derived from the equivalents thereof.

| [Description of the Reference Number] | |
| --- | --- |
| 100: user terminals | 202: AT generator |
| 200: media server control device | 203: AT controller |
| 201: AR implementation part | 204: media server operator |

The invention claimed is:

1. A device for controlling a media server that allows a user touring a tourist spot (TS) to control the media server through a mobile application (MA) of a user terminal so that a lighting module, a sound module, and a display module provided in the TS operate, the device comprising:

an augmented reality (AR) implementation part configured to implement, when a user accesses an MA through a user terminal, a TS as AR divided into a plurality of subareas (SAs) and transmit an avatar (AT) choice message (ACM) for selecting an AT to be generated in the AR to the user terminal;

an AT generator configured to generate, when the user selects an AT on the basis of the ACM, the selected AT in the AR implemented by the MA;

an AT controller configured to cause, when it is determined on the basis of location information received from a Global Positioning System (GPS) module of the user terminal that the user enters a specific SA of the TS, the generated AT to explain tour information of the specific SA;

a media server operator configured to execute, when the user enters the specific SA of the TS, a program for welcoming a user to enter the specific SA through modules provided in the specific SA;

a photo data collector configured to collect photo data captured through user terminals in the SA while users are present in the SA;

an object classifier configured to recognize objects in the photo data other than a recognized person by analyzing the collected photo data, classify corresponding photo data by recognized object, and classify objects in decreasing order of the number of pieces of classified photo data; and a representative object selector configured to select objects of a set rank or above as representative objects of the SA from among the classified objects, wherein the user accesses the MA by inputting user information including his or her age, sex, and relationship with an accompanying user through the user terminal, wherein, when the user enters the specific SA of the TS, the AT controller causes the generated AT to introduce the representative objects of the specific SA and recommend taking photos including the objects.

2. The device of claim 1, further comprising:

a recognition signal generator configured to analyze the photo data captured through the user terminal in the SA while the user is present in the SA and generate and transmit an object recognition signal to the user terminal when a representative object is recognized in the photo data; and a completion signal generator configured to generate and transmit a completion signal to the user terminal when recognition signals corresponding to all the representative objects in the SA are generated while the user is present in the SA, wherein, when the recognition signal is generated, the AT controller explains that photo data of the object corresponding to the recognition signal has been successfully captured, and when the completion signal is generated, the media server operator causes the modules provided in the specific SA to execute a program for congratulating the user on complete exploration of the SA.

3. The device of claim 2, further comprising:

a representative object classifier configured to count the number of representative objects, which are photographed by each of the users who are present in the SA, by analyzing the photo data captured through the user terminals of the users and classify the representative objects in real time in decreasing order of counting number; and a recommendation object information generator configured to recommend, when the user has not photographed some representative objects in the SA, exploration of a representative object with a largest counting number among the corresponding representative objects and generate, when a plurality of representative objects have the largest counting number, recommendation object information for recommending a representative object closest to a location of the user on the basis of location information received from the GPS module of the user terminal of the user and transmit the recommendation object information to the user terminal, wherein, when the recommendation object information is generated, the AT controller causes the generated AT to guide the user to the representative object included in the recommendation object information.

4. The device of claim 3, further comprising:

an AT counting part configured to count the number of ATs generated in each SA in real time; and a recommendation SA information transmitter configured to, when the completion signal is generated, extract first SAs that the user has not entered from SAs other than an SA corresponding to the completion signal, extract second SAs in which the counting number of ATs is a set value or less from the first SAs, generate recommendation SA information for recommending exploration of the second SAs in increasing order of distance to the SA corresponding to the completion signal, and transmit the recommendation SA information to the user terminal.

5. The device of claim 4, further comprising:

a terminal grouping part configured to receive location information of user terminals in real time and group a plurality of user terminals when the user terminals are continuously present within a set distance range for a set period of time; and a group information generator configured to analyze user information corresponding to the grouped user terminals and the number of user terminals, determine a relationship between users of the grouped user terminals, and generate group information including the determined relationship, wherein the group information includes any one of a friend relationship, a spouse relationship, a romantic relationship, a family relationship, and a parent-child relationship of the users of the grouped user terminals.

6. The device of claim 5, further comprising a server data storage configured to store programs executed by the media server operator, directing data of the AT according to the group information, and action algorithm data of the AT executed according to a specific signal from an administrator terminal, wherein, when the group information is generated, the AT controller causes ATs corresponding to the user terminals of the group information to play a role according to the directing data which is stored in the server data storage according to information included in the group information, when the group information is generated, the media server operator causes the modules provided in the SA, which is identified from the location information of the user terminal corresponding to the group information, to execute a program corresponding to the group information, and when the specific signal is generated, the AT controller controls the generated AT according to the action algorithm data stored in the server data storage.

* * * * *